US011590816B2

(12) United States Patent  
Urabe et al.

(10) Patent No.: US 11,590,816 B2  
(45) Date of Patent: Feb. 28, 2023

(54) HUB BRACKET STRUCTURE

(71) Applicant: HONDA MOTOR CO., LTD., Tokyo (JP)

(72) Inventors: Hiroyuki Urabe, Wako (JP); Takayuki Toyoshima, Wako (JP); Toshiaki Matsuzawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/548,937

(22) Filed: Dec. 13, 2021

(65) Prior Publication Data

US 2022/0185050 A1 Jun. 16, 2022

(30) Foreign Application Priority Data

Dec. 15, 2020 (JP) .............................. JP2020-207318

(51) Int. Cl.
*B60G 7/00* (2006.01)
*B60G 3/14* (2006.01)

(52) U.S. Cl.
CPC .............. *B60G 7/008* (2013.01); *B60G 3/14* (2013.01); *B60G 7/001* (2013.01); *B60G 2200/132* (2013.01); *B60G 2200/312* (2013.01); *B60G 2204/148* (2013.01); *B60G 2204/4306* (2013.01); *B60G 2206/10* (2013.01);
(Continued)

(58) Field of Classification Search
CPC .......... B60G 7/008; B60G 3/14; B60G 7/001; B60G 2200/132; B60G 2200/312; B60G 2204/148; B60G 2204/4306; B60G 2206/10; B60G 2206/8201; B60G 2206/8207
See application file for complete search history.

(56) References Cited

U.S. PATENT DOCUMENTS 8,342,547 B2 * 1/2013 Gerrard ................ B60G 21/051
280/124.128
9,815,495 B2 11/2017 Schultz
2002/0074759 A1 6/2002 Yamamoto et al.
(Continued)

FOREIGN PATENT DOCUMENTS

EP 3233541 B1 * 10/2018 ............. B60G 11/10
JP S61-87704 U 6/1986
(Continued)

OTHER PUBLICATIONS

Klaus Wallgren, Rear Suspension With Transverse Leaf Spring as Control Link, Oct. 25, 2017, Google Patents, EP 3 233 541 A1, Machine Translation (Year: 2017).*
(Continued)

*Primary Examiner* — James A English
*Assistant Examiner* — Matthew James O'Neill
(74) *Attorney, Agent, or Firm* — Rankin, Hill & Clark LLP (57) ABSTRACT

A hub bracket structure includes a hub bracket that connects a trailing arm and a hub carrier, wherein the hub bracket includes a bracket body that includes a mounting surface mounted with the hub carrier, and a rear connector that extends from the bracket body toward the trailing arm behind a ground contact point of a rear wheel, and the rear connector is extended to a position to overlap with a rear surface of the trailing arm in a front-rear direction and is joined to the rear surface of the trailing arm.

4 Claims, 6 Drawing Sheets

(52) U.S. Cl.
 CPC .............. *B60G 2206/8201* (2013.01); *B60G 2206/8207* (2013.01)

(56) References Cited

U.S. PATENT DOCUMENTS

2007/0290474 A1* 12/2007 Inoue .................. B60G 21/051
 280/124.166
2008/0277893 A1 11/2008 Murata
2014/0103627 A1* 4/2014 Deckard ................ B60R 22/00
 411/362

FOREIGN PATENT DOCUMENTS

| JP | 2002-187416 A | 7/2002 |
| JP | 2007-126039 A | 5/2007 |
| JP | 2012-086642 A | 5/2012 |
| JP | 6216836 B2 | 10/2017 |

OTHER PUBLICATIONS

Office Action received in corresponding Japanese application No. 2020-207318 dated Aug. 2, 2022 with English translation (6 pages).

* cited by examiner

HUB BRACKET STRUCTURE

CROSS-REFERENCE TO RELATED APPLICATION

The present application claims the benefit of priority to Japanese Patent Application No. 2020-207318 filed on Dec. 15, 2020, the disclosures of all of which are hereby incorporated by reference in their entireties.

TECHNICAL FIELD

The present disclosure relates to a hub bracket structure.

RELATED ART

Conventionally, known hub bracket structures with a hub bracket that connects a swinging end portion of a trailing arm to a wheel carrier (hub) include a connector at a front portion of the hub bracket, which is composed of a horizontal plate that can be elastically compressed in a vehicle width direction when a lateral force is applied from outside of a wheel (for example, Japanese Patent No. 6216836 (Patent Document 1)).

According to such a hub bracket structure, toe-in control of the tire can be performed with the aforementioned connector, to improve, for example, straight-drivability of a vehicle and to improve stability during braking by increasing the equivalent cornering power.

SUMMARY

In a conventional hub bracket structure (see, for example, Patent Document 1), however, a difference in rigidity between a front and a rear of the hub bracket is adjusted by changing a shape, a position, a size, and the like of a notch in the horizontal plate that constitutes the connector of the hub bracket, thereby the front portion of the hub bracket can be elastically deformed.

Therefore, the conventional hub bracket structure has problems such as a complicated configuration of the connector, which complicates manufacturing steps and increases manufacturing costs.

The present disclosure is intended to provide a hub bracket structure with a simpler configuration than conventional ones.

An aspect according to the present disclosure to solve the above-described problem is to provide a hub bracket structure including: a trailing arm that extends in a vehicle front-rear direction, with one end thereof axially supported by a vehicle body in a manner swingable up and down; a hub carrier that rotatably supports a wheel; and a hub bracket that connects the trailing arm and the hub carrier, wherein the hub bracket includes a bracket body that includes a mounting surface mounted with the hub carrier, and a rear connector that extends from the bracket body toward the trailing arm behind a ground contact point of the wheel, and the rear connector is extended to a position to overlap with a rear surface of the trailing arm in the front-rear direction and is joined to the rear surface of the trailing arm.

The present disclosure provides a hub bracket structure with a simpler configuration than conventional ones.

DETAILED DESCRIPTION

Next, a hub bracket structure of an embodiment of the present disclosure (present embodiment) will be described in detail.

The hub bracket structure of the present embodiment has amain characteristic that a rear connector of a hub bracket is extended to a position to overlap with a rear surface of a trailing arm in a front-rear direction and is joined to the rear surface of the trailing arm.

Note that front-rear and right-left directions in the following description are based on the directions of arrows illustrated in FIG. 1, which coincide with front-rear and right-left directions of a vehicle. In addition, the hub bracket structure of the present embodiment is applied to each of right and left rear wheels, and these hub bracket structures are symmetrical. Therefore, in the following description, except for a relationship between the right and left trailing arms and torsion beam, only the hub bracket structure applied to the left rear wheel will be described, and the description of the right hub bracket structure will be omitted.

Figure 1:
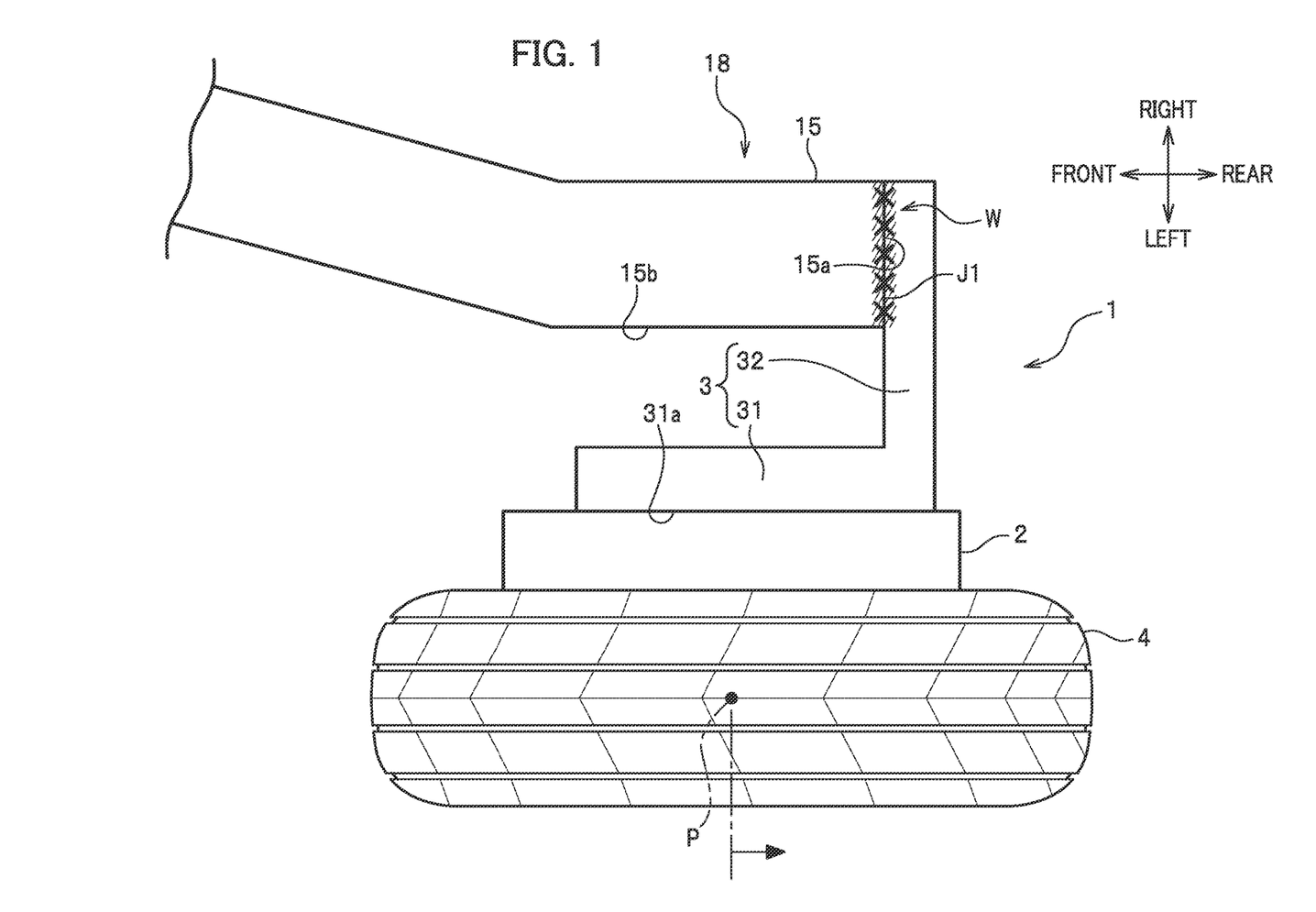
FIG. 1 is a configuration explanatory view of a hub bracket structure according to an embodiment of the present disclosure.

FIG. 1 is a configuration explanatory view of a hub bracket structure 1 according to the present embodiment.

As illustrated in FIG. 1, the hub bracket structure 1 includes a hub carrier 2 that rotatably supports a rear wheel 4 (wheel), and a hub bracket 3 that connects the hub carrier 2 to a swinging end portion of a trailing arm 15.

First, the trailing arms 15 extending in the front-rear direction will be described.

The trailing arms 15 are symmetrically arranged in pairs at both ends of the torsion beam, which is not illustrated in the drawing, extending in the vehicle width direction (right-left direction).

This torsion beam is assumed to be welded or otherwise joined to inner sides in the vehicle width direction of the pair of trailing arms 15 near front portions thereof.

At the front portion of the trailing arm 15, a bushing, not illustrated, is provided to serve as an axial support to a vehicle body. Also, a lower arm (not illustrated) may also be arranged on the inner side of the trailing arm 15.

A rear portion of the trailing arm 15 has a swinging end portion 18 with the front portion of the trailing arm 15 as the swinging center when a load is inputted from a road surface in the up-down direction to the rear wheel 4 (wheel) described below.

The hub carrier 2 is configured to include a hub having a plurality of stud bolts that fasten the rear wheel 4, which is not illustrated in the drawing, and a base portion that rotatably supports the hub on the hub bracket 3 described next.

The hub bracket 3 includes a bracket body 31 on which a mounting surface 31*a* of the hub carrier 2 is formed, and a rear connector 32 that extends from a rear portion of the bracket body 31 toward a rear surface 15a of the trailing arm 15.

The mounting surface 31a to the hub carrier 2 is formed on an outer side in the vehicle width direction of the bracket body 31 (left surface in the right-left direction in FIG. 1). A method of mounting the hub carrier 2 on the mounting surface 31a is not particularly limited, and examples thereof include welding and bolt fastening.

The bracket body 31 is separated from an outer surface 15b in the vehicle width direction of the trailing arm 15 (left surface in the right-left direction in FIG. 1) by a predetermined space.

The rear connector 32 extends from the rear portion of the bracket body 31 inward in the vehicle width direction. Specifically, a tip end portion of the rear connector 32 extending from the bracket body 31 extends to a position to overlap with the rear surface 15a of the trailing arm 15 in the front-rear direction. The tip end portion of the rear connector 32 is welded and joined to the rear surface 15a of the trailing arm 15. In other words, a joint surface J1 of the rear connector 32 to the trailing arm 15 forms a weld joint portion W.

An extension position of the rear connector 32 from the bracket body 31 in the present embodiment is not limited to the rear portion of the bracket body 31 as described above, but can be set appropriately behind a ground contact point P of the rear wheel 4 (wheel).

Note that, although not illustrated in the drawing, if the rear connector 32 extends, for example, from the vicinity of the ground contact point P of the rear wheel 4 (wheel) toward the rear surface 15a of the trailing arm 15, the rear connector 32 may be formed to extend while being inclined, curved, or formed having a stepped shape from the bracket body 31 to the rear surface 15a, in a top view of the hub bracket structure 1 illustrated in FIG. 1.

Advantageous Effects

Next, advantageous effects of the hub bracket structure 1 according to the present embodiment will be described.

In the hub bracket structure 1, the rear connector 32 of the hub bracket 3 is extended to a position to overlap with the rear surface 15a of the trailing arm 15 in the front-rear direction and is joined to the rear surface 15a of the trailing arm 15.

In the hub bracket structure 1 described above, when a lateral force is applied to the rear wheel 4 (wheel) from an outer side in the vehicle width direction when the vehicle is traveling, the rear portion of the hub bracket 3 becomes more rigid than the front portion thereof due to the rear connector 32. In other words, in the hub bracket structure, toe-in control of the tire that constitutes the rear wheel 4 (wheel) can be performed with the rear connector 32. A vehicle equipped with the hub bracket structure 1 can improve straight-drivability and stability during braking by the toe-in control.

Unlike conventional hub bracket structures (see, for example, Patent Document 1), which have complicated connectors, the hub bracket structure 1 has a simple configuration that can perform toe-in control with the aforementioned rear connector 32.

According to the hub bracket structure 1, the joint surface J1 of the rear connector 32 to the rear surface 15a of the trailing arm 15 becomes wider, and joint rigidity of the rear surface 15a of the trailing arm 15 to the rear connector 32 is increased.

In particular, when a releasing load is assumed for releasing the hub bracket 3 outward in the vehicle width direction from the trailing arm 15, the hub bracket structure 1 of the present embodiment receives this load in a shear direction at the joint surface J1 between the rear surface of the trailing arm 15 and the rear connector 32, thus exhibiting excellent joint rigidity.

Although an embodiment of the present disclosure has been described above, the present disclosure is not limited to the above-mentioned embodiment and can be implemented in various forms.

In the hub bracket structure 1 of the above-mentioned embodiment (see FIG. 1), the hub bracket 3 is joined to the trailing arm 15 only at the rear connector 32, but the hub bracket 3 can also be configured to include another connector connected to the trailing arm 15 in addition to the rear connector 32.

Figure 2:
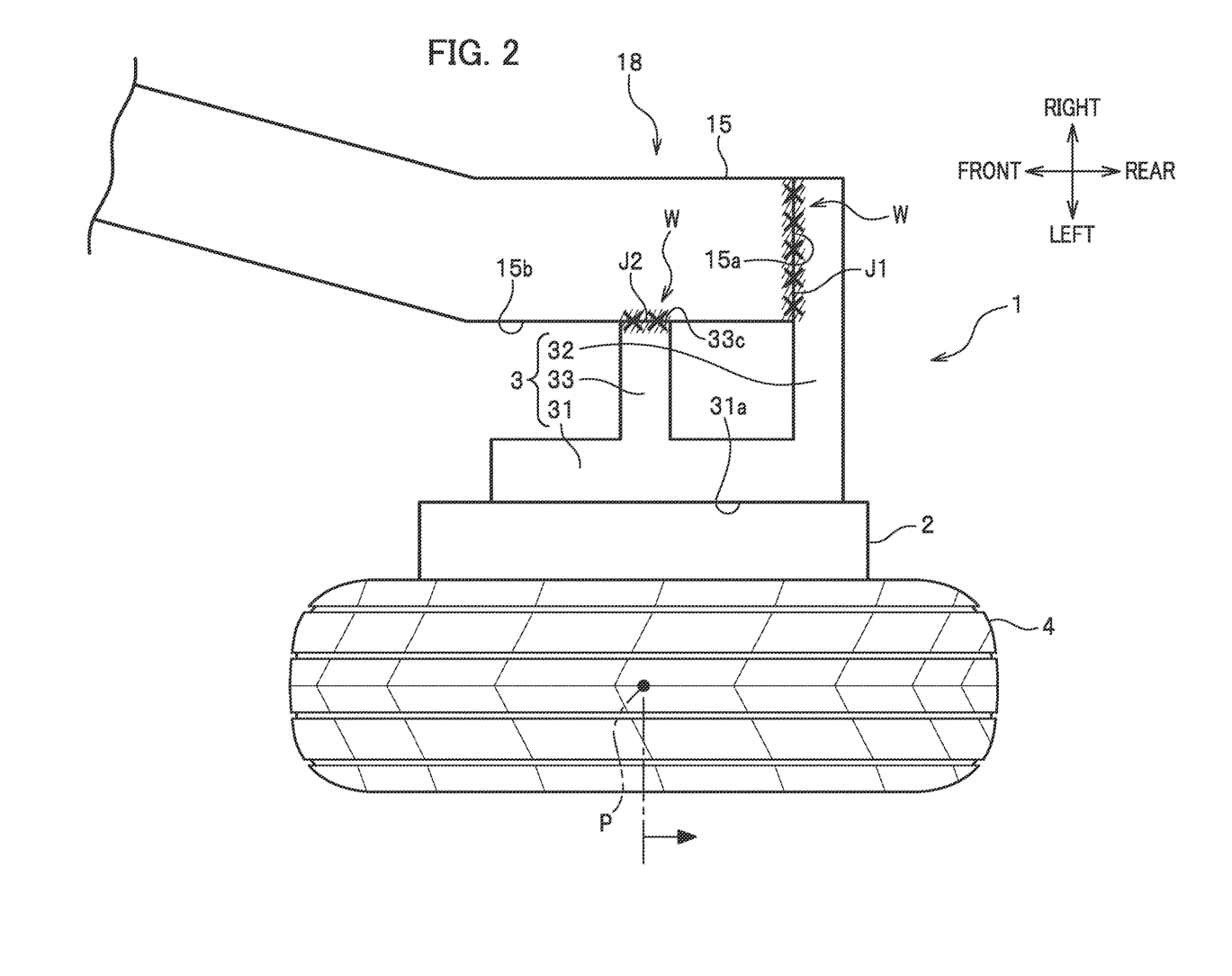
FIG. 2 is a configuration explanatory view of a first modification of the hub bracket structure of the present disclosure.

FIG. 2 is a configuration explanatory view of a first modification of the hub bracket structure 1. Note that in FIG. 2, the same constituent components as those of the above-mentioned embodiment are indicated with the same reference numerals, and the detailed explanation thereof is omitted.

As illustrated in FIG. 2, in the hub bracket structure 1 according to the first modification, the hub bracket 3 includes a front connector 33 in front of the rear connector 32. Specifically, the front connector 33 extends from the inner side in the vehicle width direction at the substantially center in the front-rear direction of the bracket body 31 to the trailing arm 15, and is welded and joined to the outer surface 15b in the vehicle width direction of the trailing arm 15. In other words, a joint surface J2 of the front connector 33 to the trailing arm 15 forms a weld joint portion W.

According to the hub bracket structure 1 according to the first modification, the front connector 33 improves joint strength of the bracket body 31 to the trailing arm 15. Meanwhile, an area of the joint surface J2 of the front connector 33 to the trailing arm 15 can be set smaller than an area of the joint surface J1 of the rear connector 32 to the rear surface 15a of the trailing arm 15. This allows the hub bracket structure 1 to have a difference in rigidity at the front and rear of the hub bracket 3 when a lateral force is applied to the rear wheel 4 (wheel) due to the difference in rigidity of the joint at the respective joint surfaces J1 and J2. The hub bracket structure 1 can perform toe-in control of the tire when such a lateral force is applied, to improve straight-drivability of the vehicle.

In addition, in the hub bracket structure 1, a connection step of the trailing arm 15 to the front connector 33 is relatively simple because the joint surface J2 between the trailing arm 15 and the front connector 33 is formed at the weld joint portion W.

Also, the hub bracket structure 1 can more reliably form an area difference in the joint surfaces J1 and J2 by forming the joint surface J2 at the weld joint portion W, and can more reliably perform toe-in control when a lateral force is applied to the rear wheel (wheel).

Figure 3:
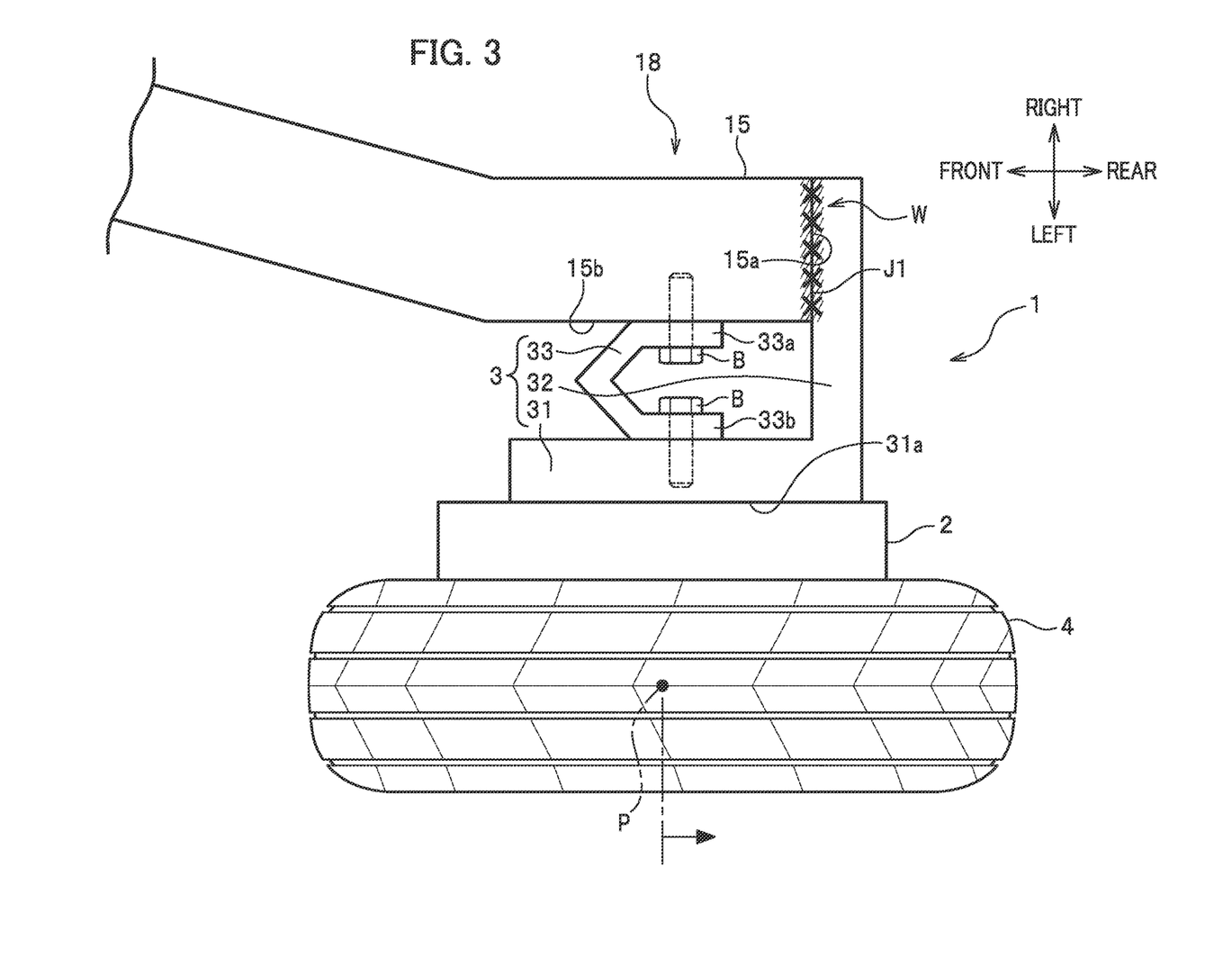
FIG. 3 is a configuration explanatory view of a second modification of the hub bracket structure of the present disclosure.

FIG. 3 is a configuration explanatory view of a second modification of the hub bracket structure 1. Note that, in FIG. 3, the same constituent components as those of the above-mentioned embodiment and the first modification are indicated with the same reference numerals, and the detailed explanation thereof is omitted.

As illustrated in FIG. 3, in the hub bracket structure 1 according to the second modification, the front connector 33 is provided as a separate member from the bracket body 31.

The front connector 33 is arranged between the inner surface in the vehicle width direction of the bracket body 31 and the outer surface 15b in the vehicle width direction of the trailing arm 15, and each of both end portions thereof is fastened with a bolt B. Note that a plurality of bolts B for fastening each of both end portions may be used. Further, the joining of the front connector 33 to the trailing arm 15 and the bracket body 31 is not limited to bolt fastening, but other joining methods may be used such as welding, riveting, and caulking.

Note that the front connector 33 in the second modification has a substantially V-shape in a top view of the hub bracket structure 1 illustrated in FIG. 3. The front connector 33 also includes, on the open side of the V-shape, a flange portion 33a arranged along the outer surface 15b in the vehicle width direction of the trailing arm 15 and a flange portion 33b arranged along the inner surface in the vehicle width direction of the bracket body 31. The front connector 33 is fastened with bolts to the trailing arm 15 and the bracket body 31 at the flange portions 33a and 33b, respectively.

In other words, the hub bracket structure 1 according to the second modification differs from the hub bracket structure 1 according to the first modification in which the front connector 33 is integrally formed on the bracket body 31 illustrated in FIG. 2, in that it is fastened with bolts to the bracket body 31 as well.

According to the front connector 33 in the second modification, by fastening the front connector 33 to the bracket body 31 with bolts as well, rigidity on the front connector 33 side, which is the front side of the hub bracket 3, can be weakened.

Also, according to the front connector 33 in the second modification, the front connector 33 has a substantially V-shape, to be elastically compressed in the vehicle width direction when a lateral force is applied.

In other words, with the simple structure as described above, toe-in control of the tire can be performed with the hub bracket structure 1 according to the second modification when a lateral force is applied, thereby improving the straight-drivability of the vehicle.

Note that the front connector 33 illustrated in FIG. 3 can be formed in a substantially U-shape in a top view of the hub bracket structure 1 illustrated in FIG. 3 or can be formed in a substantially V-shape or U-shape with the rearward-facing open side illustrated in FIG. 3 changed to the forward side.

Figure 4:
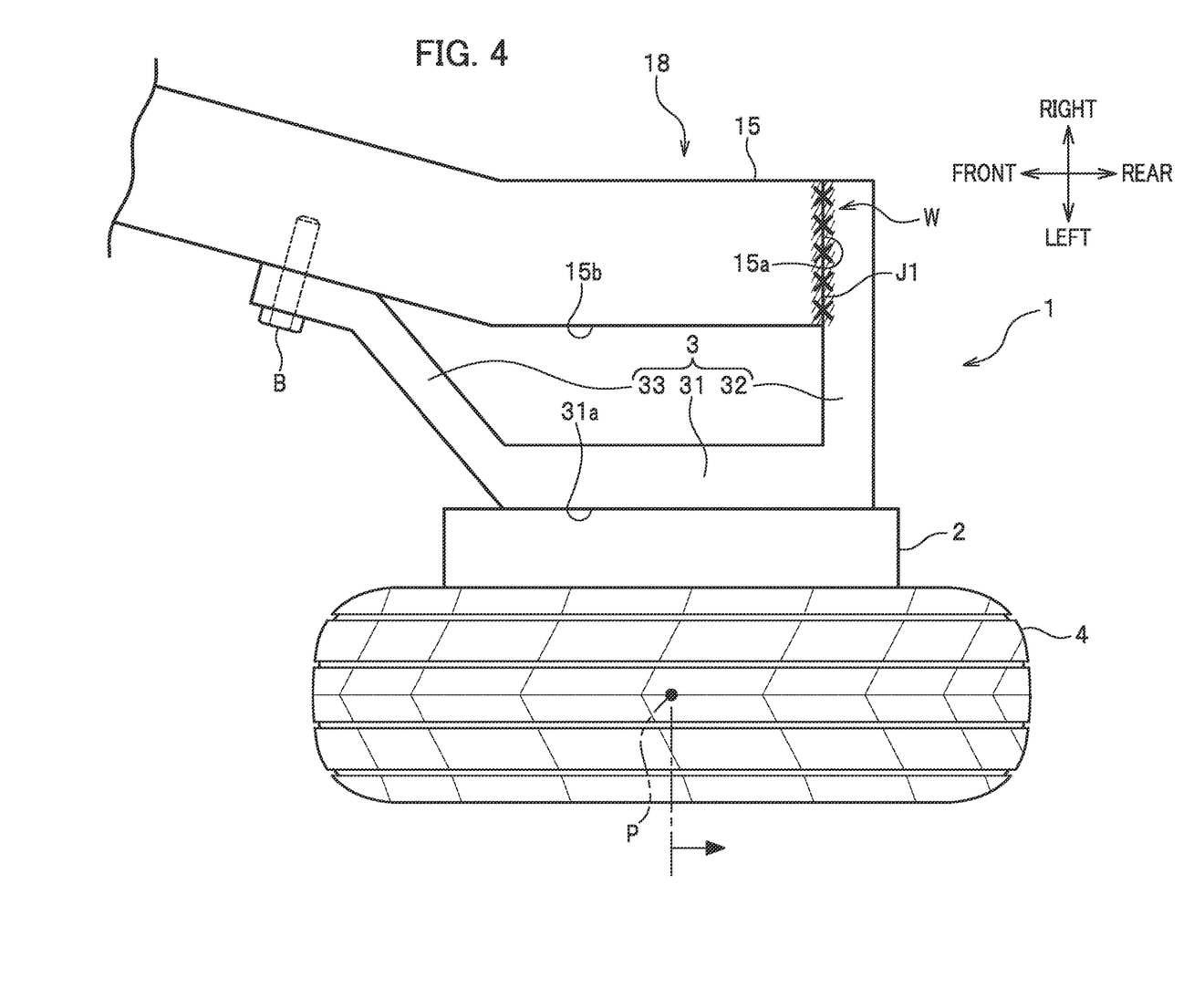
FIG. 4 is a configuration explanatory view of a third modification of the hub bracket structure of the present disclosure.

FIG. 4 is a configuration explanatory view of a third modification in the hub bracket structure 1. Note that, in FIG. 4, the same constituent components as those of the above-mentioned embodiment, the first modification, and the second modification are indicated with the same reference numerals, and the detailed explanation thereof is omitted.

As illustrated in FIG. 4, in the hub bracket structure 1 according to the third modification, the front connector 33 extends from the front portion of the bracket body 31 to the trailing arm 15, and is fastened with a bolt B to the outer surface in the vehicle width direction of the trailing arm 15. Specifically, the front connector 33 is inclined to gradually approach the trailing arm 15 as extending forward in a top view of the hub bracket structure 1 illustrated in FIG. 4. A tip of the front connector 33 is fastened to the trailing arm 15 with a bolt B. Note that a plurality of bolts B may be used for fastening.

Note that the joining of the front connector 33 to the trailing arm 15 is not limited to bolt fastening, but other joining methods may be used such as welding, riveting, and caulking.

Figure 5A:
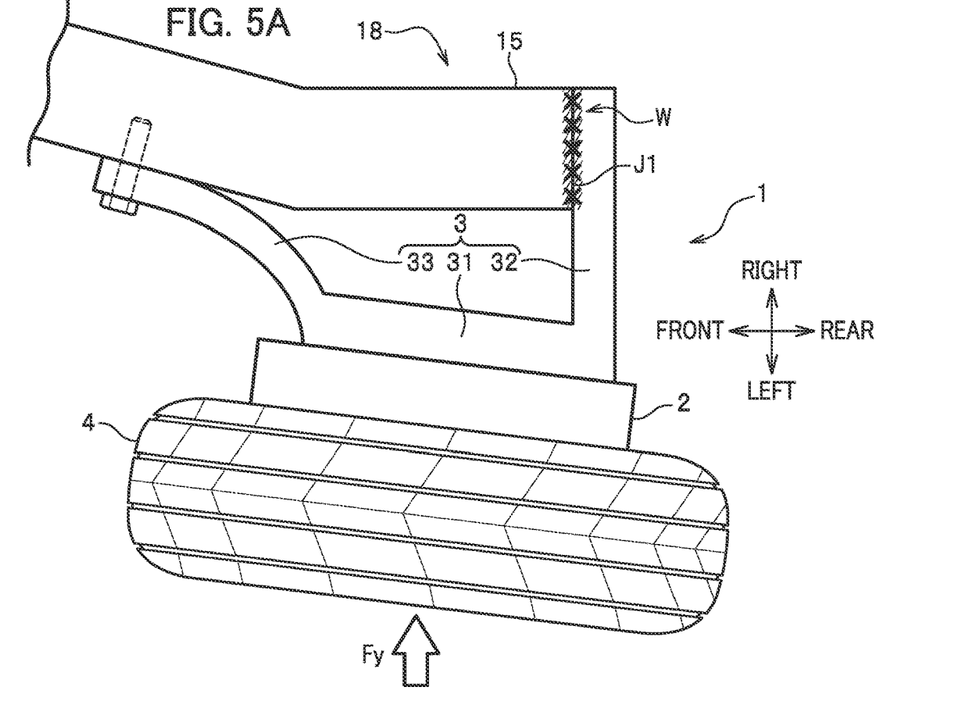
FIGS. 5A and 5B are each an operation view of a hub bracket structure according to the third modification.
Figure 5B:
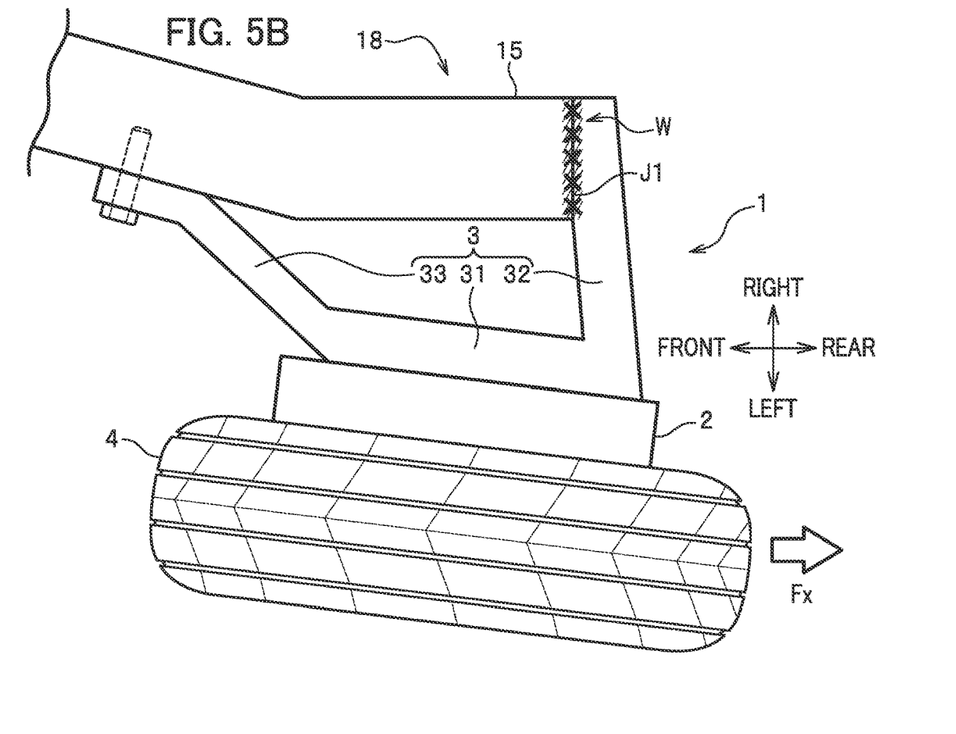

FIGS. 5A and 5B are each an operation view of the hub bracket structure 1 according to the third modification.

As illustrated in FIG. 5A, in the hub bracket structure 1 according to the third modification, when a lateral force Fy is inputted to the rear wheel 4, a load thereof is transmitted via the hub carrier 2 to the hub bracket 3. The inclined front connector 33 is then curved to be convex toward the trailing arm 15. As a result, the hub bracket structure 1 controls the toe-in based on the inputted lateral force Fy.

As illustrated in FIG. 5B, in the hub bracket structure 1 according to the third modification, when a braking force Fx is inputted, a load thereof is transmitted via the hub carrier 2 to the hub bracket 3. The joint portion between the front connector 33 and the bracket body 31 is displaced inward in the vehicle width direction, and an angle between the front connector 33 and the bracket body 31 increases. As a result, the hub bracket structure 1 controls the toe-in based on the inputted braking force Fx.

Figure 6:
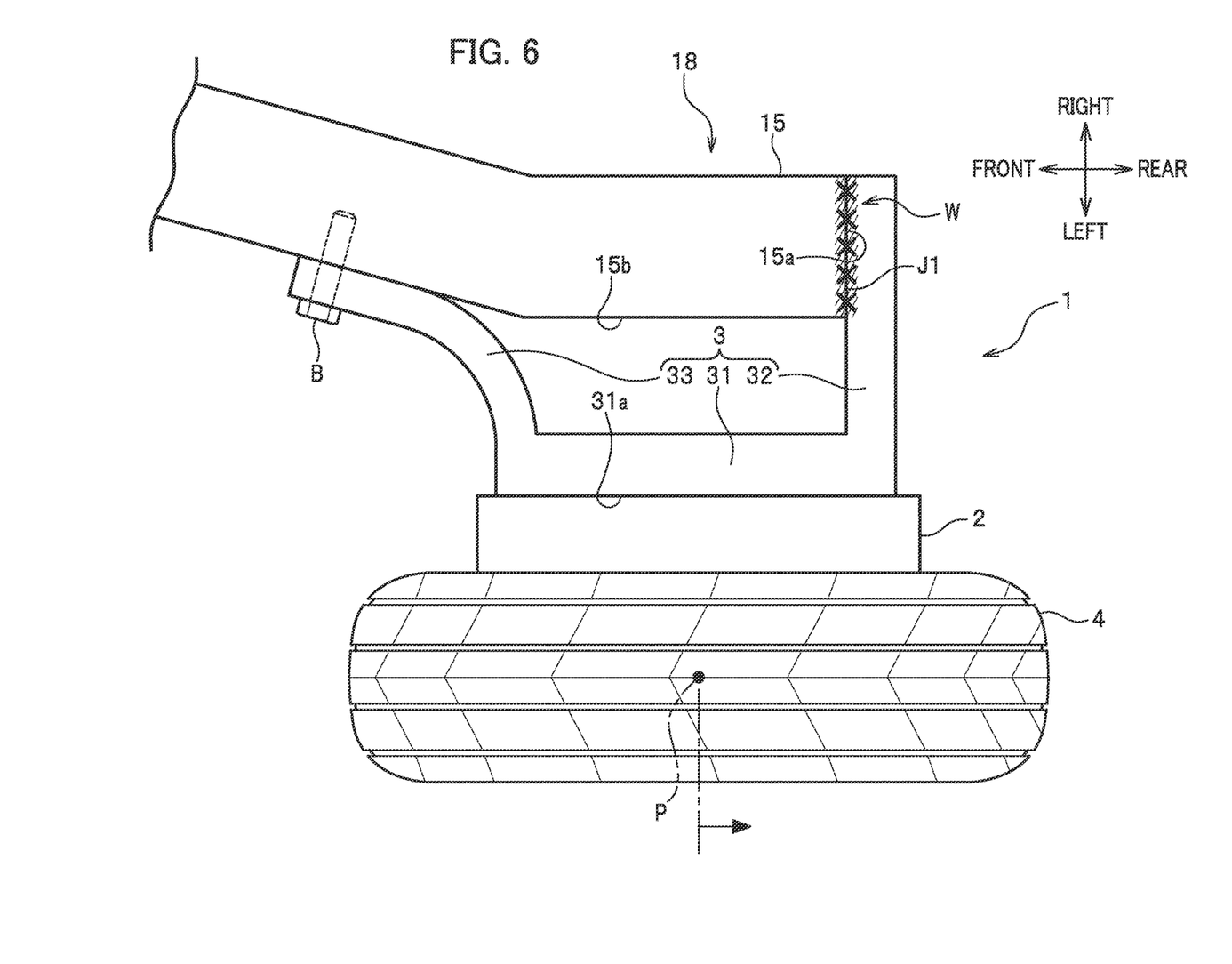
FIG. 6 is a configuration explanatory view of a fourth modification of the hub bracket structure of the present disclosure.

FIG. 6 is a configuration explanatory view of a fourth modification of the hub bracket structure 1. Note that, in FIG. 6, the same constituent components as those of the above-mentioned embodiment and the first modification to the third modification are indicated with the same reference numerals, and the detailed explanation thereof is omitted.

As illustrated in FIG. 6, in the hub bracket structure 1 according to the fourth modification, the front connector 33 is fastened with the bolt B to the trailing arm 15 at the tip which extends in an arcuately curved manner along the outer surface 15b in the vehicle width direction of the trailing arm 15 in a top view of the hub bracket structure 1. Note that a plurality of bolts B may be used for fastening. Further, the joining of the front connector 33 to the trailing arm 15 is not limited to bolt fastening, but other joining methods may be used such as welding, riveting, and caulking.

In the hub bracket structure 1 according to the fourth modification, degree of freedom of adjusting load response characteristics to the inputted lateral force Fy and braking force Fx is increased, compared to the hub bracket structure 1 according to the third modification (see FIG. 4) in which the front connector 33 extends linearly.

As mentioned above, various joining methods such as bolt fastening, welding, riveting, and caulking may be used as methods to join the front connector 33 to the trailing arm 15 and bracket body 31 of the hub bracket structure 1. Among them, the bolt fastening is preferable, because toe-in control can be performed with a simple structure when a lateral force or braking force is applied, thereby improving the straight-drivability of the vehicle and stability during braking.

What is claimed is:

1. A hub bracket structure comprising:
   a trailing arm that extends in a vehicle front-rear direction, with one end thereof axially supported by a vehicle body in a manner swingable up and down;
   a hub carrier that rotatably supports a wheel; and
   a hub bracket that connects the trailing arm and the hub carrier, wherein
   the hub bracket includes
   a bracket body that includes a mounting surface mounted with the hub carrier, and
   a rear connector that extends from the bracket body toward the trailing arm behind a ground contact point of the wheel, the rear connector is extended to a position to overlap with a rear surface of the trailing arm in a front-rear direction and is joined to the rear surface of the trailing arm, the hub bracket further includes a front connector gradually approaching the trailing arm as extending forward from a front portion of the bracket body and extending to arcuately curve so as to be convex toward the trailing arm, and a tip of the front connector is joined to the trailing arm.

2. The hub bracket structure according to claim 1, wherein the front connector is welded, at an inner end portion thereof in a vehicle width direction, to the outer surface in the vehicle width direction of the trailing arm.

3. The hub bracket structure according to claim 1, wherein the rear connector is welded to the rear surface of the trailing arm, and the front connector is fastened to the outer surface in a vehicle width direction of the trailing arm.

4. The hub bracket structure according to claim 3, wherein the front connector is formed of a separate member from the bracket body and is fastened to the bracket body with a bolt.

\* \* \* \* \*